United States Patent [19]

Chevalier et al.

[11] Patent Number: 4,968,373

[45] Date of Patent: Nov. 6, 1990

[54] AQUEOUS DISPERSION OF STYRENE-ACRYLIC POLYMERS AND ITS APPLICATION TO WATER RESISTANT ADHESIVE COMPOSITIONS ESPECIALLY SUITED FOR TILING

[75] Inventors: Pierre Chevalier, Paris; Christian Sidot, Ezanville, both of France

[73] Assignee: Societe Francaise Hoechst, Puteaux, France

[21] Appl. No.: 481,074

[22] Filed: Feb. 16, 1990

Related U.S. Application Data

[62] Division of Ser. No. 304,251, Jan. 31, 1989, Pat. No. 4,923,921.

[30] Foreign Application Priority Data

Feb. 24, 1988 [FR] France ................................ 88 02215

[51] Int. Cl.$^5$ .......................... C09J 4/00; C08K 44/00
[52] U.S. Cl. .................. 156/331.8; 524/812; 156/330.9
[58] Field of Search .......................... 156/330.9, 331.8

[56] References Cited

U.S. PATENT DOCUMENTS 4,421,889 12/1983 Braum et al. .

FOREIGN PATENT DOCUMENTS 2320319 6/1976 France .
2061990 8/1980 United Kingdom .

*Primary Examiner*—Joseph L. Schofer
*Assistant Examiner*—Mark Sweet
*Attorney, Agent, or Firm*—Browdy and Neimark

[57] ABSTRACT

An aqueous styrene-acrylic type polymer dispersion useful as a wet strength adhesive contains at least one copolymer consisting of 0.5 to 5% by weight of N-allylacetoacetamide monomer (A) and 99.5 to 95% by weight of a mixture of monomers (B) consisting of 90 to 99.9% by weight of styrene and of at least one monomer selected from $C_1$ to $C_8$ alkyl (meth)acrylates and 10 to 0.1% by weight of at least one monomer selected from acrylic acid, methacrylic acid, acrylamide and methacrylamide.

8 Claims, No Drawings

AQUEOUS DISPERSION OF STYRENE-ACRYLIC POLYMERS AND ITS APPLICATION TO WATER RESISTANT ADHESIVE COMPOSITIONS ESPECIALLY SUITED FOR TILING

This is a division of application Ser. No. 304,251, filed Jan. 31, 1989, now U.S. Pat. No. 4,923,921.

The present invention relates to an aqueous dispersion of polymers of the type styrene-acrylic and its application to water resistant adhesive compositions especially suited for tiling.

Aqueous dispersions of styrene-acrylic polymers are widely used in the preparation of adhesive compositions but they generally produce an adhesive which is highly sensitive to humidity. For their application in the field of tile adhesives, attempts to improve their water resistance have been made by incorporating various additives, generally mineral products (see, for example, European Patent Application Nos. 0,035,353 and 0,182,628, British Patent Application No. 2,061,990 or U.S. Pat. No. 4,590,230). The results are satisfactory for normal interior tiling but are not effective for exterior tiling which is exposed to the elements, however.

In order to overcome this drawback, the Applicant has discovered an aqueous dispersion of styrene-acrylic polymers which yields adhesive compositions capable of being used as a water resistant adhesive for tiles.

An aqueous styrene-acrylic type polymer dispersion according to the present invention is characterized in that it comprises at least one copolymer consisting of 0.5 to 5% by weight of N-allylacetoacetamide monomer (A) and 99.5 to 95% by weight of a mixture of monomers (B) consisting of 90 to 99.9% by weight of styrene and of at least one monomer selected from $C_1$ to $C_8$ alkyl(meth)acrylates and 10 to 0.1% by weight of at least one monomer selected from acrylic acid, methacrylic acid, acrylamide and methacrylamide.

The expression $C_1$ to $C_8$ alkyl(meth)acrylate may, for example, designate methyl acrylate, ethyl acrylate, butyl acrylate, 2-ethylhexyl acrylate, methyl methacrylate, ethyl methacrylate, butyl methacrylate or 2-ethylhexyl methacrylate.

The copolymer forming part of the dispersion in accordance with the invention has a glass transition temperature Tg between 5° and 50° C., advantageously between 20° and 40° C., and may be constituted exclusively by monomers A and B defined above. However, it may also additionally comprise for 100 parts by weight of monomers A and B up to three parts by weight of at least one conventional reticulating monomer selected from acrylic and methacrylic acid N-alphahydroxyalkylamides such as N-methylol(meth)acrylamide and polyol oligoacrylates and oligomethacrylates such as trimethylolpropane tri(meth)acrylate.

An aqueous dispersion according to the invention generally has a solid matter content of between 40 and 65% by weight and may be obtained by conventional polymerisation methods in aqueous emulsions of monomers A and B, carried out at an acidic pH, advantageously between 4 and 6, in the presence of 0.5 to 10% by weight with respect to monomer weight of at least one nonionic or anionic dispersing agent; 0.1 to 3% by weight with respect to monomer weight of at least one polymerisation initiator which generates free radicals such as ammonium persulphate combined if necessary with an accelerator such as sodium metabisulphite may also be added. Finally, between 0.01 and 0.5% by weight with respect to the monomer weight of at least one transfer agent such as an alkylmercaptan (e.g. n-dodecylmercaptan) may be added.

A further object of the present invention is the use of the aqueous dispersion as hereinbefore defined in adhesive compositions. These adhesive compositions contain 2 to 50% by weight of a dispersion according to the present invention, the complement being constituted by conventional ingredients for this type of composition such as mineral fillers, organic solvents, preservatives, bactericides, dispersants and/or thickeners. Such compositions are very readily obtained by simply mixing the ingredients to produce adhesives with high water resistance, particularly when tiling both horizontal and vertical exterior concrete.

The following examples are intended to illustrate the invention without limiting its scope.

EXAMPLE 1

503 g water, 3.2 g nonylphenol ethoxylated with 30 moles ethylene oxide, 1.8 g sequenced and sulphated propylene ethylene oxide sequenced copolymer having a molecular weight of about 2,600, hereinafter termed emulsifier E, and 0.58 g ammonium persulphate were placed in a polymerisation reactor.

The solution was stirred and maintained at 85°±2° C. Over a period of about 4 hours, 1,427 g aqueous emulsion was introduced, constituted by:

384.04 g water,
24 g nonylphenol ethoxylated with 30 moles ethylene oxide,
14.2 g emulsifier E,
1.16 g ammonium persulphate,
989.4 g of the following monomers:

| | | |
|---|---|---|
| styrene | 486.8 g | 49.2% |
| n-butylacrylate | 420.5 g | 42.5% |
| methylacrylamide | 23.7 g | 2.4% |
| acrylic acid | 9.9 g | 1% |
| methacrylic acid | 19.8 g | 2% |
| N-allyl acetoacetamide | 28.7 g | 2.9% |

0.2 g ammonium persulphate in 26 g water was then introduced into the reaction medium and the reaction continued for a further 30 minutes at 85°±2° C. After cooling to room temperature and filtering, 1,963.6 g aqueous dispersion containing about 53% dry extract was obtained, having a Brookfield viscosity of 830 mPa.s (axis 2, speed 20) and a pH of 4.4.

EXAMPLE 2

The method of Example 1 was employed, using a starting culture constituted by 190 g water and a pre-emulsion containing:
649 g of the following monomers:
  357 g (55%) styrene,
  256 g (39.4%) n-butyl acrylate,
  14 g (2.2%) methacrylamide,
  3 g (0.4%) methacrylic acid,
  19 g (2.9%) N-allyl acetoacetamide,
174 g water,
15 g nonylphenol ethoxylated with 30 moles ethylene oxide
6 g TRITON X 200 produced by ROHM & HAAS,
1.26 g sodium bicarbonate,
0.63 g n-dodecylmercaptan,
3.1 g sodium persulphate.

On completion of introduction of the aqueous emulsion, a solution of 0.5 g ammonium persulphate in 5 g water was added and the reaction medium stirred for 45 minutes at 85°±2° C. After cooling to room temperature and filtering, 1,044 g aqueous dispersion containing about 64% dry extract was obtained, having a pH of 4.85 and a Brookfield viscosity of 240 mPa.s (axis 2, speed 20).

EXAMPLE 3

Comparative Example

Example 2 was repeated, omitting N-allyl acetoacetamide. 1,025 g aqueous dispersion containing about 64% dry extract was obtained, having a pH of 4.85 and a Brookfield viscosity of 204 mPa.s (axis 2, speed 20).

EXAMPLE 4

An adhesive composition was prepared by mixing:
725 g silica,
8 g hexane,
8 g propyleneglycol,
3 g cellulose ether (viscosity 30,000),
1.5 g bactericidal agent,
1 g antifoaming agent,
1.5 g dispersant,
x g dispersion according to the invention.
The mixture was made up to 1,000 g with water.

This composition was employed to stick 5 cm by 5 cm stoneware tiles to a standard concrete test piece (see "Technical specifications for applying celled exterior wall coverings using cement-free adhesives, no. 255-4, Dec. 1984). This test piece was dried for seven days at 23° C. in an atmosphere having 50% relative humidity and the tile adhesion determined using a dynamometer (rate of application of load: 20 mm/min). The test piece was then immersed in water at room temperature for seven days and following drying for four hours at room temperature the tile adhesion was determined again. The results obtained are set out in the following table:

|  | X(g) | Resistance (kg/cm$^2$) Dry | Wet |
| --- | --- | --- | --- |
| Dispersion of Example 1 | 160 | >10 | 6 |
| Dispersion of Example 2 | 124 | >10 | 6.3 |
| Dispersion of (comparative) Example 3 | 124 | >10 | 0 |

This table shows that the dispersion according to the present invention produces adhesives having considerably greater resistance to wetness than conventional aqueous dispersions of styrene-acrylic polymers.

The description of the present invention is by way of illustration only and is not in any way intended to limit its scope; any appropriate modification can be made with regard to substituting equivalents without departing from the scope of the invention.

We claim:

1. In a method of adhering an article to a substrate by means of an adhesive, the improvement wherein said adhesive comprises an aqueous styrene-acrylic type polymer dispersion containing at least one copolymer consisting of 0.5 to 5% by weight of N-allylacetoacetamide monomer (A) and 99.5 to 95% by weight of a mixture of monomers (B) consisting of 90 to 99.9% by weight of styrene and of at least one monomer selected from $C_1$ to $C_8$ alkyl(meth)acrylates and 10 to 0.1% by weight of at least one monomer selected from the group consisting of acrylic acid, methacrylic acid, acrylamide and methacrylamide.

2. A method according to claim 1 wherein said copolymer further comprises for 100 parts by weight of monomers (A) and (B) up to three parts by weight of at least one reticulating monomer selected from the group consisting of the N-alphahydroxyalkylamide of acrylic and methacrylic acid, polyol oligoacrylates and oligomethacrylates.

3. A method according to claim 1 wherein said adhesive has a solids content of between 40% and 65% by weight.

4. A method according to claim 2 wherein said adhesive has a solids content of between 40% and 65% by weight.

5. A method according to claim 1 wherein said article is a tile.

6. A method according to claim 2 wherein said article is a tile.

7. A method according to claim 3 wherein said article is a tile.

8. A method according to claim 4 wherein said article is a tile.

* * * * *